United States Patent
Mitsui

(10) Patent No.: US 12,271,639 B2
(45) Date of Patent: Apr. 8, 2025

(54) PRINTING APPARATUS, PRINTING METHOD, AND PRINTING CONTROL PROGRAM FOR PERFORMING PRINT JOB WITH DESIRED PRINT SETTINGS

(71) Applicant: SEIKO EPSON CORPORATION, Tokyo (JP)

(72) Inventor: Yoichi Mitsui, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/194,671

(22) Filed: Apr. 3, 2023

(65) Prior Publication Data

US 2023/0315350 A1    Oct. 5, 2023

(30) Foreign Application Priority Data

Apr. 5, 2022  (JP) .................................. 2022-063079

(51) Int. Cl.
*G06F 3/12* (2006.01)

(52) U.S. Cl.
CPC .......... *G06F 3/1204* (2013.01); *G06F 3/1254* (2013.01); *G06F 3/1262* (2013.01)

(58) Field of Classification Search
CPC ...... G06F 3/126; G06F 3/1257; G06F 3/1237; G06F 3/1212; G06F 3/1204; G06F 3/12; G06F 3/1254; G06F 3/1262; G06F 3/1263
See application file for complete search history.

(56) References Cited

U.S. PATENT DOCUMENTS

| | | | |
|---|---|---|---|
| 10,101,950 B2 * | 10/2018 | Kikuchi | G06F 3/1263 |
| 10,976,969 B2 | 4/2021 | Iida et al. | |
| 2010/0310268 A1 * | 12/2010 | Obata | G03G 15/234 399/85 |
| 2010/0328721 A1 * | 12/2010 | Ohira | G06F 3/1262 358/1.15 |
| 2016/0070518 A1 * | 3/2016 | Saito | G06F 3/1263 358/1.15 |
| 2017/0038723 A1 * | 2/2017 | Watanabe | G03G 15/6541 |
| 2019/0009595 A1 * | 1/2019 | Kawamura | G06F 3/12 |
| 2019/0121588 A1 * | 4/2019 | Teruya | G06F 3/1256 |
| 2020/0310724 A1 * | 10/2020 | Aher | G06F 3/1261 |

FOREIGN PATENT DOCUMENTS

JP       2020-17216 A       1/2020

OTHER PUBLICATIONS

English Machine Translation of JP 2020010104 A (Ono, Published Jan. 16, 2020) (Year: 2020).*

* cited by examiner

*Primary Examiner* — Juan M Guillermety
(74) *Attorney, Agent, or Firm* — WORKMAN NYDEGGER

(57) ABSTRACT

A printing apparatus includes a communication unit configured to receive print jobs, a storage unit configured to accumulate the print jobs received by the communication unit, a printing unit configured to print the print jobs, and a control unit. The control unit acquires print setting information related to the print jobs via the communication unit, performs collective setting of a print order and/or the number of print copies of the print jobs accumulated in the storage unit in accordance with the print setting information, and causes the printing unit to perform printing in accordance with the collective setting of the print jobs accumulated in the storage unit.

11 Claims, 8 Drawing Sheets

PRINTING APPARATUS, PRINTING METHOD, AND PRINTING CONTROL PROGRAM FOR PERFORMING PRINT JOB WITH DESIRED PRINT SETTINGS

The present application is based on, and claims priority from JP Application Serial Number 2022-063079, filed Apr. 5, 2022, the disclosure of which is hereby incorporated by reference herein in its entirety.

BACKGROUND

1. Technical Field

The present disclosure relates to a printing apparatus, a printing method, and a printing control program.

2. Related Art

A printing apparatus can receive and accumulate print jobs transmitted from an external terminal, and then can print the print jobs.

As a related technology, an image forming apparatus including a transmission unit that transmits screen information for causing an external apparatus to display a screen capable of simultaneously receiving designation of a plurality of print files to be transmitted to the image forming apparatus linked to a folder associated with print settings information and a program for determining an order of transmitting the plurality of print files designated on the screen to the external apparatus, and a control unit that causes an image forming unit to perform image formation based on the print files transmitted in association with the folder and using the print setting information in an order in which the print files are transmitted has been disclosed (refer to JP-A-2020-17216).

A user may attempt to perform the print jobs transmitted to a printing apparatus from the outside at various timings and accumulated in a storage medium in the printing apparatus in accordance with print settings such as a desired order and number of copies. In this case, the user performs necessary setting work for each of the print jobs accumulated as described above through an operation of an operation panel or a user interface screen. This work is complicated, and the user may make a mistake in setting. In particular, when printing is performed again for a print job that has been set as a print target once after being accumulated, a necessary setting work is performed each time, and the degree of complication and mistakes increases.

Further, according to JP-A-2020-17216, it is difficult to change the print jobs into a print order, the number of copies, and the like desired by the user after being transmitted to the folder of the image forming apparatus.

In view of such circumstances, there is a demand for an improvement that allows a user to easily and accurately make print settings desired by the user for a print job transmitted from the outside and accumulated in a printing apparatus.

SUMMARY

A printing apparatus includes a communication unit configured to receive print jobs, a storage unit configured to accumulate the print jobs received by the communication unit, a printing unit configured to print the print jobs, and a control unit, wherein the control unit acquires print setting information related to the print jobs via the communication unit, performs collective setting of a print order and/or the number of print copies of the print jobs accumulated in the storage unit in accordance with the print setting information, and causes the printing unit to perform printing in accordance with the collective setting of the print jobs accumulated in the storage unit.

A printing method performed by the printing apparatus includes an accumulation step for receiving print jobs through communication with an outside and accumulating the print jobs in a storage unit, an acquisition step for acquiring print setting information related to the print jobs through communication with the outside, a setting step for performing collective setting of a print order and/or the number of print copies of the print jobs accumulated in the storage unit in accordance with the print setting information, and a printing step for performing printing in accordance with the collective setting of the print jobs accumulated in the storage unit.

In a non-transitory computer-readable storage medium storing a printing control program for controlling a printing apparatus, the printing control program is configured to cause the printing apparatus to perform an accumulation function of receiving print jobs through communication with an outside and accumulating the print jobs in a storage unit, an acquisition function of acquiring print setting information related to the print jobs through communication with the outside, a setting function of performing collective setting of a print order and/or the number of print copies of the print jobs accumulated in the storage unit in accordance with the print setting information, and a printing function of performing printing in accordance with the collective setting of the print jobs accumulated in the storage unit.

DESCRIPTION OF EXEMPLARY EMBODIMENTS

Embodiments of the present disclosure will be described below with reference to the accompanying drawings. Each of the drawings is merely illustrative for describing the embodiment. Since each of the drawings is illustrative, proportions. shapes, and shading may not be exact, may not match each other, or may be omitted.

1. General Description of Apparatus Configuration

Figure 1:
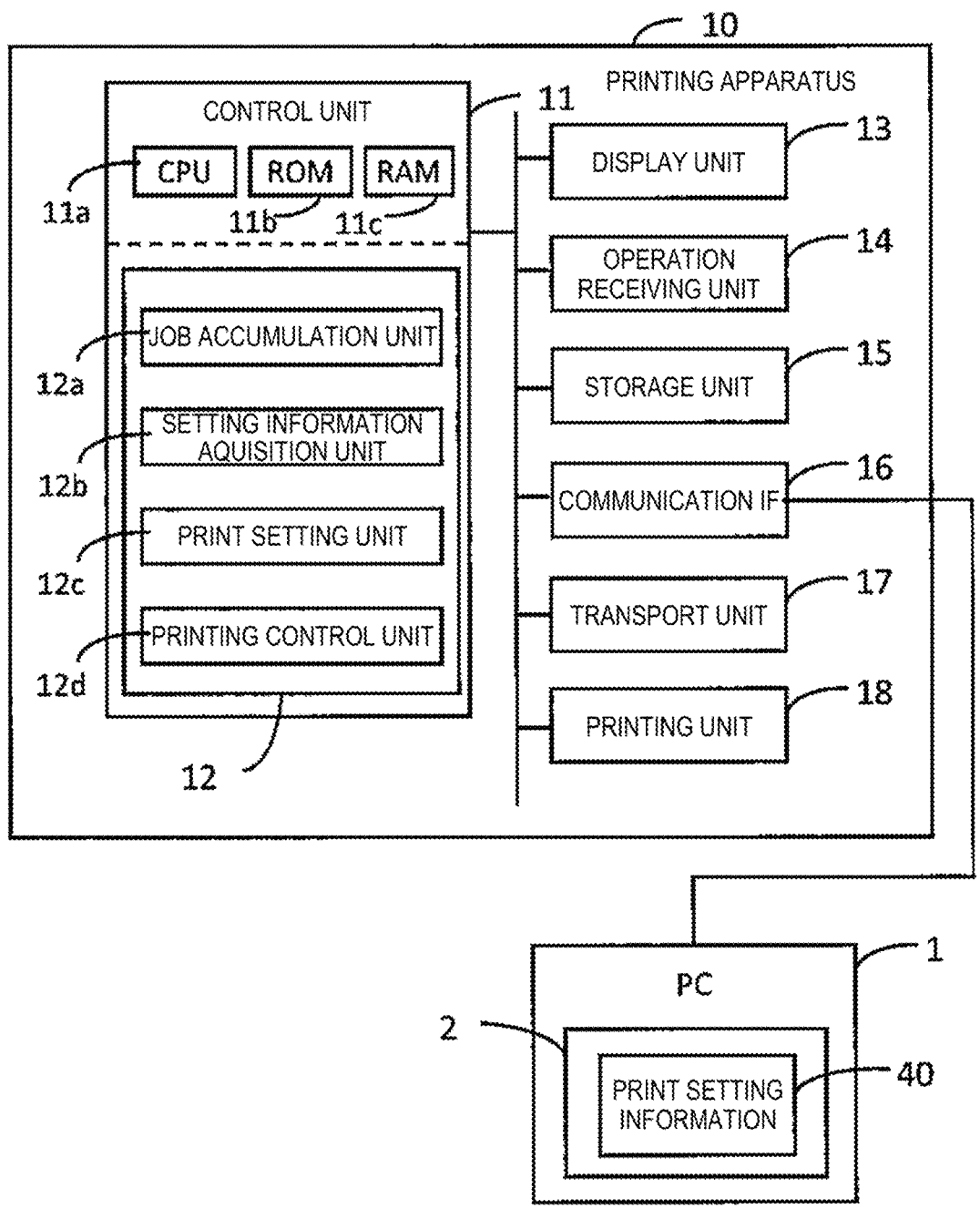
FIG. 1 is a block diagram simply illustrating a configuration of an apparatus.

FIG. 1 simply illustrates a configuration of a printing apparatus 10 according to the embodiment. A printing method is performed by the printing apparatus 10.

The printing apparatus 10 includes a control unit 11, a display unit 13, an operation receiving unit 14, a storage unit 15, a communication IF 16, a transport unit 17, and a printing unit 18. IF is an abbreviation for interface. The control unit 11 is configured to include, as a processor, one or more ICs including a CPU 11a, a ROM 11b, a RAM 11c, and the like, another non-volatile memory, and the like.

In the control unit 11, a processor, that is, the CPU 11a executes arithmetic processing in accordance with the program 12 stored in the ROM 11b, the other memory, or the like, using the RAM 11c or the like as a work area, to realize various functions such as a job accumulation unit 12a, a setting information acquisition unit 12b, a print setting unit 12c, and a printing control unit 12d. The program 12 corresponds to a printing control program. The processor is not limited to the single CPU, and a configuration in which the processing is performed by a plurality of CPUs or a hardware circuit such as an ASIC may be adopted, or a configuration in which the CPU and the hardware circuit cooperate to perform the processing may be adopted.

The display unit 13 is a unit that displays visual information, and is constituted, for example, by a liquid crystal display, an organic EL display, or the like. The display unit 13 may be configured to include a display and a drive circuit for driving the display. The operation receiving unit 14 is a unit that receives an operation or an input by a user, and is realized, for example, by a physical button, a touch panel, a mouse, a keyboard, or the like. The display unit 13 and the operation receiving unit 14 may be collectively referred to as an operation panel of the printing apparatus 10. The operation receiving unit 14 as a touch panel is implemented as one function of the display unit 13. Therefore, it may be understood that the display unit 13 includes the operation receiving unit 14.

The storage unit 15 is, for example, a hard disk drive, a solid-state drive, or a storage unit using another memory. A part of the memory included in the control unit 11 may be regarded as the storage unit 15. The storage unit 15 may be regarded as a part of the control unit 11.

The communication IF 16 is a generic term for one or a plurality of IFs for the printing apparatus 10 to perform wired or wireless communication with an external device in accordance with a predetermined communication protocol including known communication standards. The communication IF 16 corresponds to a "communication unit". The external device is, for example, a communication device such as a personal computer (PC), a server, a smartphone, and a tablet terminal. In the example of FIG. 1, the printing apparatus 10 is coupled to a PC1 via a communication IF 16. The number of external devices to which the printing apparatus 10 is communicably coupled is not limited to one.

The transport unit 17 is a unit that transports a medium 30 along a predetermined transport route under the control of the control unit 11. The transport unit 17 includes, for example, a roller that rotates to transport the medium 30, and a motor as a power source of rotation. In addition, the transport unit 17 may be a mechanism that transports the medium 30 by mounting the medium 30 on a drum, a belt, or a pallet that is driven by a motor. The medium 30 is, for example, paper, and may be any medium that can be a target of printing, and may be a material other than paper, such as a film or fabric. In addition, the medium 30 may be label paper including a mount and a label attached to the mount in a peelable manner.

The printing unit 18 is a unit that performs printing on the medium 30 using a coloring material such as ink or toner. A printing method employed by the printing unit 18 is not particularly limited, and may be, for example, an inkjet method or an electrophotographic method. When the printing unit 18 is configured to employ an inkjet method, the printing unit 18 includes a print head including a plurality of nozzles capable of ejecting ink dots.

The printing apparatus 10 is a single printer of which a configuration is integrated.

Alternatively, the printing apparatus 10 may be a printing system realized by a plurality of apparatuses or devices being communicably coupled to each other. The printing system includes, for example, an information processing device that mainly serves as the control unit 11, and a printer that includes the transport unit 17 and the printing unit 18 and performs printing under the control of the information processing device. In this case, the information processing device can be understood as a printing control device, an image processing device, or the like. The storage unit 15 may be a part of the information processing device or the printer, or may be a storage device that is not a part of either the information processing device or the printer and is accessible from the information processing device or the printer. Similarly, the display unit 13 and the operation receiving unit 14 may be a part of the information processing device or the printer, or may be a peripheral device coupled to the information processing device or the printer.

Figure 2:
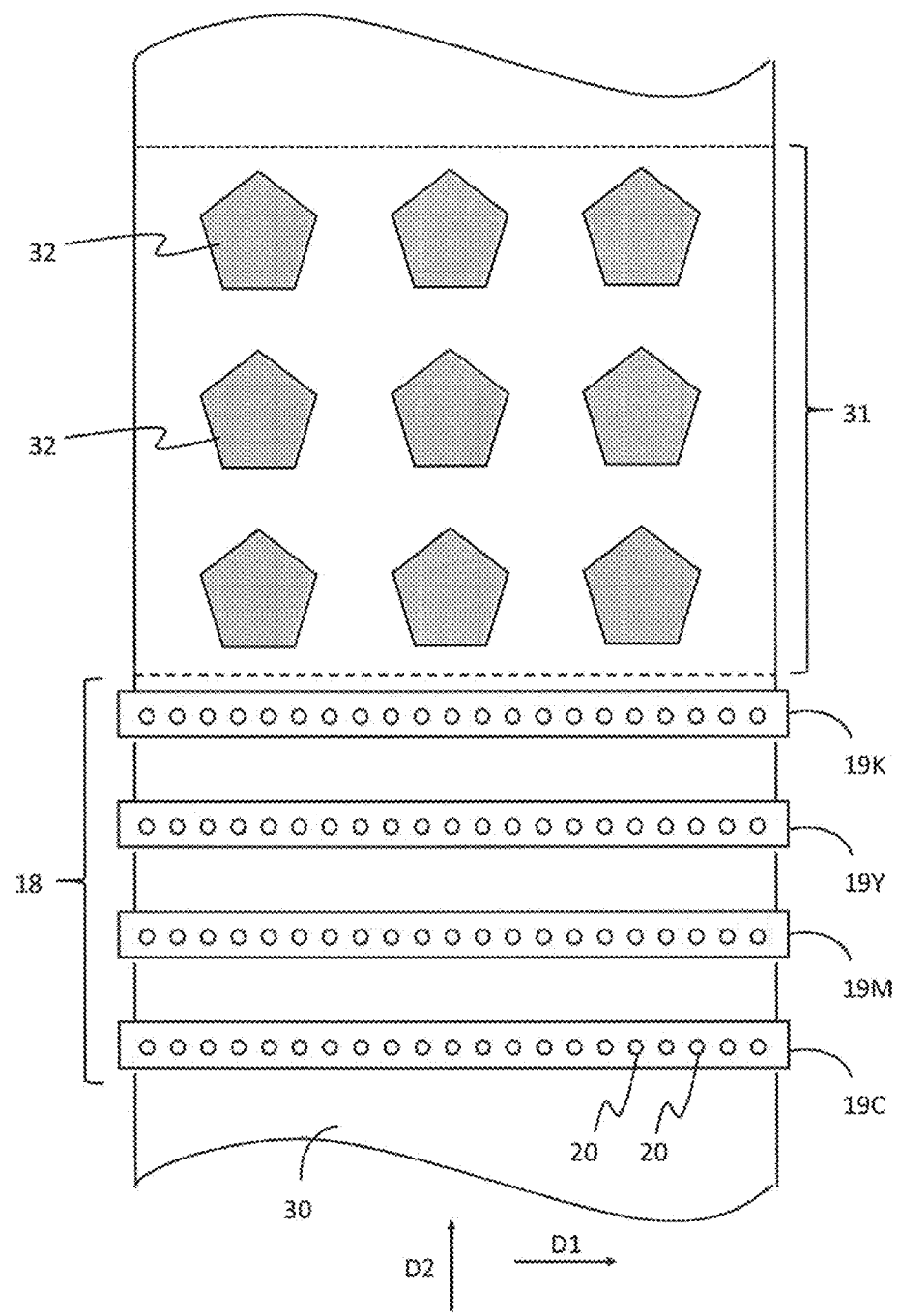
FIG. 2 is a diagram simply illustrating a relationship between a medium and a printing unit when seen from above.

FIG. 2 simply illustrates a relationship between the printing unit 18 and the medium 30 according to an example from a viewpoint from above. In the example of FIG. 2, the printing unit 18 includes print heads 19C, 19M, 19Y, and 19K. Each of the print heads 19C, 19M, 19Y, and 19K includes a plurality of nozzles 20 capable of ejecting ink. Each white circle illustrated in FIG. 2 is an individual nozzle 20. The printing unit 18 ejects a plurality of types of ink. As the ink, for example, each of color inks such as cyan (C), magenta (M), yellow (Y), and black (K) is assumed. The printing unit 18 may be capable of ejecting various liquids such as white ink, ink of other colors, a reaction liquid, and a coating liquid.

FIG. 2 very simply illustrates a configuration in which the plurality of nozzles 20 are arranged in a first direction D1 at regular or substantially regular intervals in each of the print heads 19C, 19M, 19Y, and 19K. A second direction D2 intersecting the first direction D1 is a transport direction D2 of the medium 30 with respect to the transport unit 17, and the transport unit 17 transports the medium 30 from upstream to downstream in the transport direction D2. Upstream and downstream in the transport direction D2 are simply referred to as upstream and downstream. The first direction D1 and the transport direction D2 are orthogonal or substantially orthogonal. The first direction D1 may be referred to as a widthwise direction D1 of the medium 30. The transport route of the medium 30 may include a curve in the process from upstream to downstream.

The print head 19C is a print head in which the plurality of nozzles 20 for ejecting C ink are arranged. Similarly, the print head 19M is a print head in which the plurality of nozzles 20 for ejecting M ink are arranged, the print head 19Y is a print head in which the plurality of nozzles 20 for ejecting Y ink are arranged, and the print head 19K is a print head in which the plurality of nozzles 20 for ejecting K ink are arranged. The plurality of print heads 19C, 19M, 19Y, 19K are arranged in the transport direction D2 and are located at the same position in the widthwise direction D1. Further, each of the print heads 19C, 19M, 19Y, and 19K has a length in the widthwise direction D1 that can cover a medium width which is a length of the medium 30 in the widthwise direction D1.

In FIG. 2, a nozzle arrangement direction in which the plurality of nozzles 20 constituting the same print head are arranged is parallel to the widthwise direction D1, but the nozzle arrangement direction may obliquely intersect the widthwise direction D1. In addition, in FIG. 2, the print heads 19C, 19M, 19Y, and 19K are separated and independent from each other in the transport direction D2, but the print heads 19C, 19M, 19Y, and 19K may be a head unit in which the print heads are integrally formed.

The control unit 11 causes the printing unit 18 to eject ink onto the medium 30 based on print data representing an image of a print job. As is known, in the print heads 19C, 19M, 19Y, and 19K, drive elements are provided for the respective nozzles 20, the respective nozzles 20 eject dots or do not eject dots by controlling application of drive signals to the drive elements of the respective nozzles 20 in accordance with the print data, and thus an image represented by the print data is printed on the medium 30. The control unit 11 controls the transport unit 17 and the printing unit 18 to eject ink onto the medium 30 passing under the print heads 19C, 19M, 19Y, and 19K, thereby printing an image on the medium 30.

In the example of FIG. 2, the medium 30 is a long medium that is continuous in the transport direction D2. A region of a constant size indicated by a reference numeral 31 in the medium 30 is a unit region of printing by the printing unit 18, and is referred to as a frame 31. That is, the medium 30 is configured by coupling a plurality of frames 31. Dashed lines separating the frames 31 illustrated in FIG. 2 may or may not actually be present. In the example of FIG. 2, a plurality of objects 32 are printed on the frame 31 downstream of the printing unit 18. Here, the medium 30 is label paper, and an object 32 is printed on each of the plurality of labels in the frame 31. That is, in the example of FIG. 2, the print data is data for printing a group of the plurality of objects 32 on the frame 31. Although details are omitted, the frame 31 on which the plurality of objects 32 are printed is, for example, cut from the medium 30 and is handled as a product in a step downstream of the printing unit 18.

A specific example of the printing unit 18 that employs the inkjet method is not limited to the configuration illustrated in FIG. 2. For example, the printing unit 18 may include a movable carriage on which the print heads 19C, 19M, 19Y, and 19K are mounted. Under the control of the control unit 11, the carriage may move parallel to the first direction D1 and/or the second direction D2, and during the movement, the print heads 19C, 19M, 19Y, and 19K may perform printing by ejecting ink onto the media 30 of which transport is temporarily stopped. The nozzle arrangement direction in the print heads 19C, 19M, 19Y, and 19K mounted on the carriage may face the second direction D2 instead of the first direction D1.

2. Printing Control Processing

Figure 3:
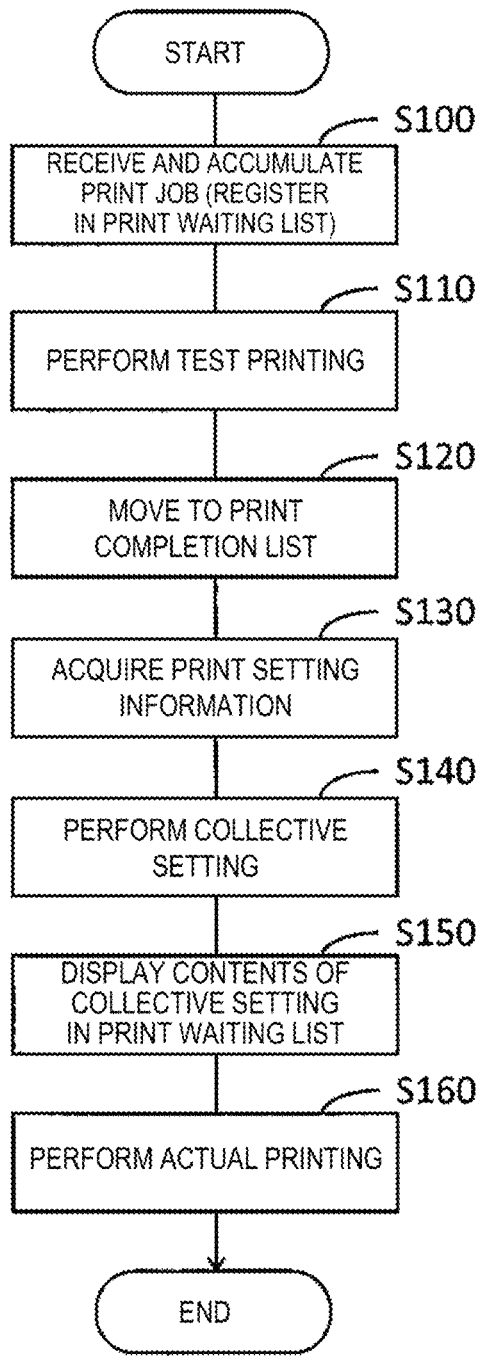
FIG. 3 is a flowchart illustrating printing control processing.

FIG. 3 is a flow chart illustrating printing control processing performed by the control unit 11 according to the program 12 in response to inputs and instructions. A printing method will be disclosed by description of the printing control processing.

A user operates an external apparatus such as a PC1 to transmit a print job to the printing apparatus 10. For example, the user accesses the printing apparatus 10 through an UI screen of the external apparatus and performs an operation in which a desired print job is moved to a predetermined folder included in the printing apparatus 10. Thus, the user can transmit the print job to the printing apparatus 10. UI is an abbreviation for user interface.

A job accumulation unit 12a of the control unit 11 accumulates the print job transmitted from the external device and received by the communication IF16 in the storage unit 15 (Step S100). Step S100 corresponds to an "accumulation step" in which a print job is received through communication with the outside and accumulated in the storage unit 15. The print job includes test setting information that is print setting information for test printing, and image data representing an image to be printed. The test setting information is, for example, information described in a format such as a job definition format (JDF). Further, the image data is generated in a format such as portable document format (PDF).

Although Step S100 is described as one step in the flowchart in FIG. 3, actually, the print job is transmitted to the printing apparatus 10 at an arbitrary timing of the user who operates the external apparatus, and the job accumulation unit 12a accumulates the print job in the storage unit 15 every time the communication IF 16 receives the print job. In this way, the job accumulation unit 12a first registers the print jobs accumulated in the storage unit 15 in a "print waiting list". The job accumulation unit 12a manages statuses of the print jobs, such as print waiting and print completion, using the print waiting list and a "print completion list".

Next, the printing control unit 12d causes the printing unit 18 to perform test printing of the print job registered in the print waiting list upon receiving an instruction from the user to print the print job registered in the print waiting list (Step S110). The user can issue various instructions such as an instruction to perform printing and an instruction to perform collective setting which will be described later by operating the operation receiving unit 14.

Since the test printing is printing for confirming the quality of printing results before main printing, basically, the number of print copies to be printed per print job may be one. Referring to the example of FIG. 2, printing of one copy means printing on one frame 31. Therefore, when two or more copies are printed, printing is repeated on two or more frames 31. In the embodiment, the number of print copies is set to one in the test setting information of the print job, and the printing control unit 12d performs test printing of the number of print copies according to the test setting information for each of the print jobs. Needless to say, the printing control unit 12d converts the image data of the print job into print data in a format that can be used by the printing unit 18, transmits the converted print data to the printing unit 18, and then causes the printing unit 18 to perform printing based on the print data. With reference to the example of FIG. 2, the print data in a format that can be used for printing by the printing unit 18 is data in which ejection or non-ejection of dots is defined for each pixel and each CMYK ink.

FIGS. 4A, 4B, 5A, and 5B each illustrate a management screen 50 of a print job as a type of UI screen displayed on the display unit 13 by the control unit 11. According to FIG. 4A and the like, the management screen 50 includes a Print Waiting tab 51, a Print Completion tab 52, a Setting tab 53, and a Print button 54. The user can switch display content of the management screen 50 by arbitrarily selecting and operating the Print Waiting tab 51, the Print Completion tab 52, and the Setting tab 53. The Print Waiting tab 51 is a tab for displaying a current print waiting list, and the Print Completion tab 52 is a tab for displaying a current print completion list.

Figure 4A:
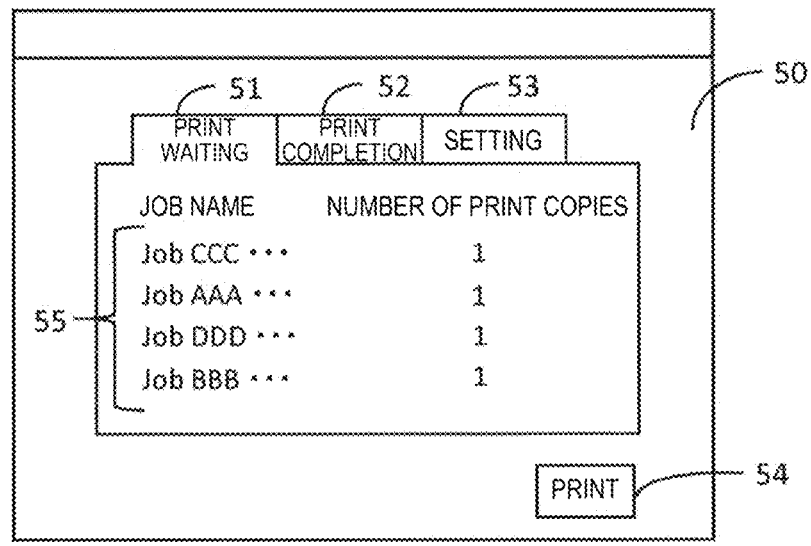
FIG. 4 is a diagram illustrating an example of a management screen in each of FIG. 4A and FIG. 4B.

According to FIG. 4A, the Print Waiting tab 51 is selected. Therefore, the current print waiting list 55 is displayed on the management screen 50. For example, a print job having a job name "CCC", a print job having a job name "AAA", a print job having a job name "DDD", and a print job having a job name "BBB" are registered in the print waiting list 55. Further, for each of the print jobs, the number of print copies is set to one in accordance with the test setting information included in the print job. In the print waiting list 55, basically, a print job transmitted from the external apparatus in an earlier order is displayed at a higher position in the list.

When the user operates the Print button 54 in a state illustrated in FIG. 4A, the printing control unit 12d causes the printing unit 18 to perform the print jobs "CCC", "AAA", "DDD", and "BBB" in the print waiting list 55 at the respective settings of the number of print copies and in this order. This results in the test printing of Step S110.

In Step S120, the job accumulation unit 12a deletes the print job of which printing has been completed among the print jobs registered in the print waiting list from the registration in the print waiting list, and registers the print job in the print completion list. That is, the print job of which printing has been completed is moved from the print waiting list to the print completion list.

Figure 4B:
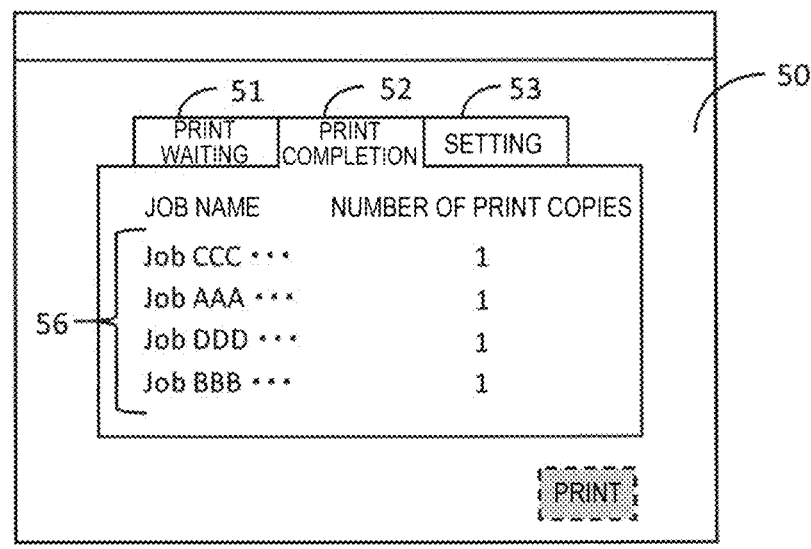

According to FIG. 4B, the Print Completion tab 52 is selected, and the current print completion list 56 is displayed on the management screen 50. FIG. 4B illustrates a state after each of the print jobs in the print waiting list 55 illustrated in FIG. 4A is test-printed in Step S110 and then moved to the print completion list 56 in Step S120. The user can confirm the print job of which printing has been completed by selecting the Print Completion tab 52.

The setting information acquisition unit 12b acquires "print setting information 40" relating to a print job through communication with the outside (Step S130). The print setting information 40 is information that collectively describes print settings for actual printing of a print job. Step S130 corresponds to an "acquisition step" of acquiring the print setting information 40.

Figure 5A:
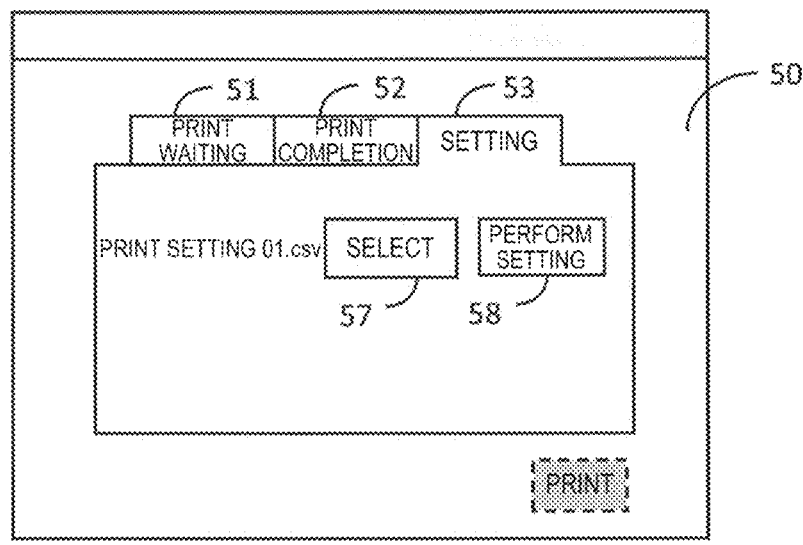
FIG. 5 is a diagram illustrating an example of the management screen in each of FIG. 5A and FIG. 5B.

According to FIG. 5A, the Setting tab 53 is selected, and as a result, a Select button 57 and a Perform Collective Setting button 58 are displayed on the management screen 50. The user can select the print setting information 40 by operating the Select button 57. For example, PC1 includes a shared folder 2 that can be referred to from the printing apparatus 10, another printing apparatus (not illustrated), or the like, and one or more pieces of print setting information 40 are stored in advance in the shared folder 2. When the Select button 57 is operated, the setting information acquisition unit 12b accesses the shared folder 2 via the communication IF 16, and presents the print setting information 40 stored in the shared folder 2 to the user so as to be visibly recognized on the management screen 50. The shared folder 2 is not limited to the PC1, and may be included in the storage unit 15 of the printing apparatus 10.

The user performs a predetermined operation of arbitrarily selecting one piece of print setting information 40 from among the presented pieces of print setting information 40. The setting information acquisition unit 12b acquires the print setting information 40 selected by the user from the shared folder 2 via the communication IF 16 or the like. As a result, the print setting information 40 having a file name "print setting 01" is acquired in the example of FIG. 5A. The print setting information 40 is a text file or a file in a table format. The print setting information 40 is, for example, a file generated in a format such as comma separated value (CSV).

In Step S140, the print setting unit 12c performs collective setting of the print order and the number of print copies of the print jobs accumulated in the storage unit 15 in accordance with the print setting information 40 acquired in Step S130. Step S140 corresponds to a "setting step" that performs the collective setting. That is, the user touches and operates the Perform Collective Setting button 58 in a state in which one piece of the print setting information 40 is selected as described above. When the Perform Collective Setting button 58 is operated, the print setting unit 12c performs the collective setting in accordance with the print setting information 40. The Perform Collective Setting button 58 corresponds to a "reception button unit" that receives an instruction to perform the collective setting.

The collective setting refers to processing of collectively performing at least settings for a plurality of print jobs or settings for a plurality of setting items. Processing for setting one setting item of one print job is not different from setting performed one by one by the user, and thus is not referred to as the collective setting.

It is assumed that the print setting information 40 acquired in Step S130 is, for example, information in which the print order and the number of print copies are defined as follows with respect to a plurality of print jobs "CCC", "AAA", "DDD", and "BBB".

Print job "AAA" print order=first, the number of print copies=10 copies

Print job "BBB" print order=second, the number of print copies=20 copies

Print job "CCC" print order=third, the number of print copies=30 copies

Print job "DDD" print order=fourth, the number of print copies=40 copies

The print setting unit 12c collectively sets the print order and the number of print copies for the print jobs stored in the storage unit 15 and designated by the print setting information 40 as indicated by the print setting information 40.

Figure 5B:
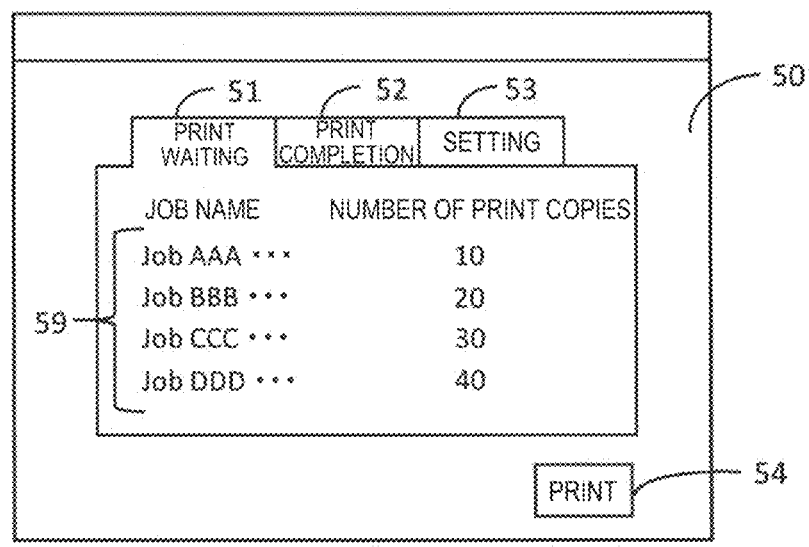

According to FIG. 5B, the Print Waiting tab 51 is selected, and as a result, the current print waiting list 59 is displayed on the management screen 50. That is, after the user operates the Perform Collective Setting button 58, the control unit 11 displays the content of the collective setting on the management screen 50 as the print waiting list 59 in response to the selection of the Print Waiting tab 51 (Step S150). In this way, the control unit 11 causes the display unit 13 to display a print job that causes the printing unit 18 to perform printing according to the collective setting performed in Step S140. As can be seen from the comparison with the print waiting list 55 before the performing of the test printing in FIG. 4A, in the print waiting list 59 in FIG. 5B, the print order and the number of print copies of the plurality of print jobs "CCC", "AAA", "DDD", and "BBB" are set to the content desired by the user for the actual printing.

As can be seen by comparing FIG. 5B with FIG. 4B, each of the print jobs registered in the print completion list 56 is registered again in the print waiting list. Therefore, the collective setting in Step S140 involves processing of deleting the registration to the print completion list of the print job designated by the print setting information 40 among the print jobs registered in the print completion list and then moving the print job to the print waiting list. When the user operates the Perform Collective Setting button 58, the control unit 11 may perform Step S140 and automatically display the contents of the collective setting as a print waiting list on the management screen 50 even though the Print Waiting tab 51 is not selected by the user (Step S150).

When an instruction to perform printing is received in a state in which the print waiting list 59 is displayed on the management screen 50, the printing control unit 12*d* causes the printing unit 18 to perform the actual printing of the print job registered in the print waiting list 59 (Step S160). When the user operates the Print button 54 in the state illustrated in FIG. 5B, the printing control unit 12*d* causes the printing unit 18 to print the print jobs "AAA", "BBB", "CCC", and "DDD" in the print waiting list 59 in this order and with the respective settings of the number of print copies. This results in the actual printing of Step S160. Step S160 corresponds to a "printing step" of performing printing according to the collective setting of the print jobs accumulated in the storage unit 15. The flowchart illustrated in FIG. 5 ends here.

A design of the management screen 50 in each of the drawings is merely an example. For example, the design may be such that the display corresponding to each of the tabs 51, 52, and 53 can be changed and visually recognized at the same time without selecting the tabs 51, 52, and 53. In addition, the buttons 54, 57, and 58 in the management screen 50 are buttons on a touch panel, but at least some of the buttons may be physical buttons. For example, the Perform Collective Setting button 58 may be a physical button provided on the display unit 13 or the operation receiving unit 14.

The instruction to perform the collective setting may not be an operation of the Perform Collective Setting button 58 by the user. For example, the control unit 11 may receive the instruction to perform the collective setting from an external device such as a PC1 operated by a user via the communication IF 16. Specifically, the control unit 11 can acquire the print setting information 40 (Step S130) and can perform the collective setting of Step S140 by receiving the print setting information 40 and the instruction to perform the collective setting from the external device via the communication IF 16.

The print setting information 40 acquired in Step S130 may be not only information for collectively setting the print order of the print jobs and the number of print copies for each of the print jobs, but also information for collectively setting only one of the print order or the number of print copies. That is, the printing control unit 12*d* prints the plurality of print jobs in the print order designated by the print setting information 40. In this case, the number of print copies of each of the print jobs may be one, or may be a predetermined number of copies common to each of the print jobs. Alternatively, the printing control unit 12*d* prints each of the print jobs with the number of print copies designated by the print setting information 40 for each of the plurality of print jobs. In this case, the print order of the print jobs is not particularly limited.

3. Additional Description of Printing Control Processing

In the examples of FIGS. 4B and 5B, each of the print jobs moved to the print completion list 56 after the test printing is designated by the print setting information 40 and becomes a target of the collective setting in Step S140. That is, an example in which there is no print job in the print waiting list at the start of Step S140 has been described. However, the print job designated by the print setting information 40 may be distributed between the print waiting list and the print completion list. Therefore, in Step S140, the print setting unit 12*c* may extract the print job designated by the print setting information 40 from among the print jobs waiting for printing accumulated in the storage unit 15 and the print jobs of which printing has been completed, and may perform the collective setting of the extracted print job in accordance with the print setting information 40. Then, in Step S160, the printing control unit 12*d* causes the printing unit 18 to perform printing in accordance with the collective setting of the print job extracted as described above.

Figure 6:
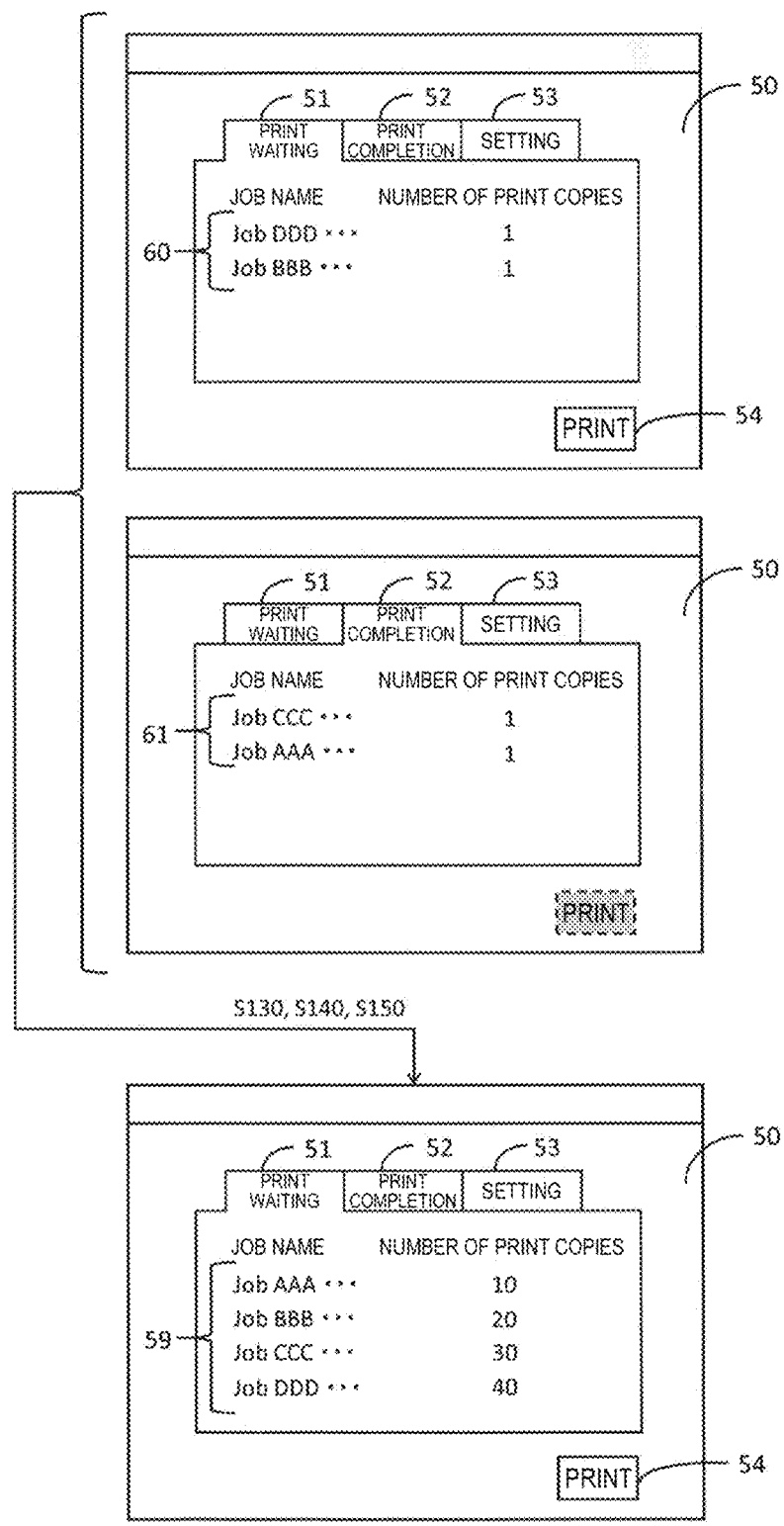
FIG. 6 is a diagram illustrating a transition example of display contents of the management screen.

FIG. 6 exemplifies the management screen 50 as in FIG. 4A and the like. In addition, a state in which the display content of the management screen 50 transitions is illustrated. The management screen 50 illustrated in the upper part and the middle part of FIG. 6 illustrates a print waiting list 60 and a print completion list 61 at the same timing. According to FIG. 6, when the user selects the Print Waiting tab 51 at a certain timing, the print waiting list 60 in which the print jobs "DDD" and "BBB" before the test printing are registered is displayed on the management screen 50, whereas, when the user selects the Print Completion tab 52, the print completion list 61 in which the print jobs "CCC" and "AAA" after the test printing are registered is displayed on the management screen 50. In such a situation, when Steps S130, S140, and S150 are performed, as illustrated in the lower part of FIG. 6, a print waiting list 59 in which collectively set print jobs "AAA", "BBB", "CCC", and "DDD" are registered is displayed on the management screen 50.

That is, the print setting unit 12*c* extracts the print jobs "DDD" and "BBB" designated by the print setting information 40 from the print waiting list 60, extracts the print jobs "CCC" and "AAA" designated by the print setting information 40 from the print completion list 61, and performs the collective setting of the extracted print jobs in accordance with the print setting information 40. The management screen 50 illustrated in the lower part of FIG. 6 is exactly the same as the management screen 50 illustrated in FIG. 5B.

According to the above description, it is understood that the test printing is not essential in the embodiment. In other words, a print waiting job before test printing can be set as a target of actual printing by collective setting. In addition, it is also possible to set the print job registered in the print completion list after the actual printing as a target of the actual printing again by the collective setting. In any case, in a state in which the print job is registered in at least one of the print waiting list or the print completion list in the storage unit 15, the control unit 11 can acquire the print setting information 40, can perform the collective setting, and can cause the printing unit 18 to print the print job in accordance with the collective setting.

A print job other than the print job designated by the print setting information 40 may be registered in the print waiting list or the print completion list. Therefore, the control unit 11 may cause the printing unit 18 to print a print job not designated by the print setting information 40, among the print jobs accumulated in the storage unit 15, before or after the printing in accordance with the collective setting of the print job designated by the print setting information 40.

Figure 7:
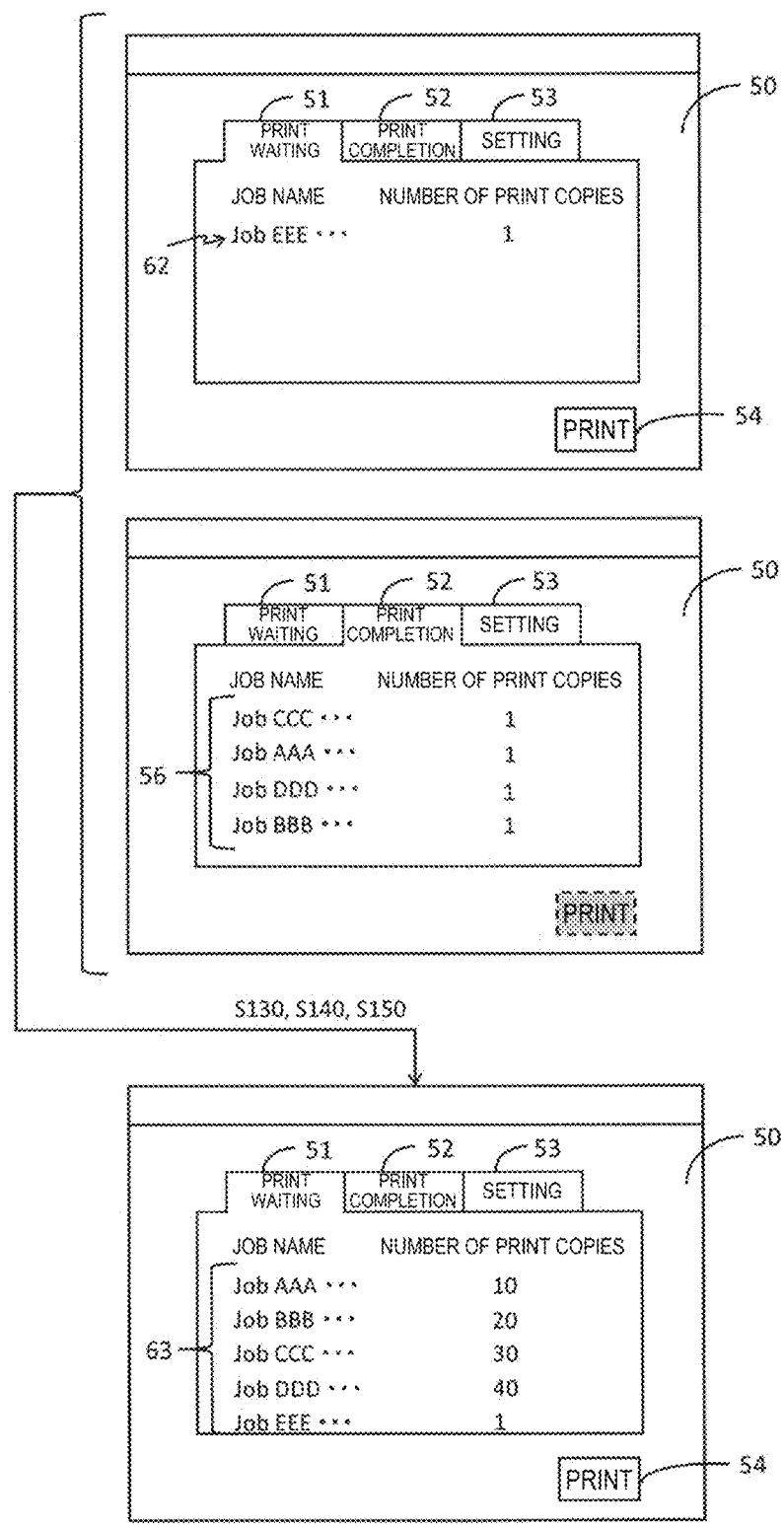
FIG. 7 is a diagram illustrating a transition example of the display contents of the management screen.

FIG. 7 illustrates a state in which the display content of the management screen 50 transitions. The management screen 50 illustrated in the upper part and the middle part of FIG. 7 illustrates the print waiting list 62 and the print completion list 56 at the same timing. According to FIG. 7, when the user selects the Print Waiting tab 51 at a certain timing, the print waiting list 62 in which a print job "EEE" before the test printing is registered is displayed on the management screen 50, whereas, when the user selects the Print Completion tab 52, the print completion list 56 in which the print jobs "CCC", "AAA", "DDD", and "BBB" after the test printing are registered is displayed on the management screen 50. The print completion list 56 is the print completion list illustrated in FIG. 4B.

As described above, according to the print setting information 40, it is assumed that print jobs "AAA", "BBB", "CCC", and "DDD" are designated. The print job "EEE" is not designated in the print setting information 40. In such a situation, when Steps S130, S140, and S150 are performed, as illustrated in the lower part of FIG. 7, a print waiting list 63 in which collectively set print jobs "AAA", "BBB", "CCC", and "DDD" are registered is displayed on the management screen 50. In addition to the print jobs "AAA", "BBB", "CCC", and "DDD" in which the print order and the number of print copies are collectively set in accordance with the print setting information 40, the print waiting list 63 includes the print job "EEE" that has been in the print waiting list 62 before the performing of Steps S130, S140, and S150.

The printing control unit 12*d* may perform the actual printing with respect to the print jobs "AAA", "BBB", "CCC", and "DDD" which are collectively set in the print waiting list 63 in accordance with the collective setting thereof. The printing control unit 12*d* causes the printing unit 18 to perform test printing with respect to the print job "EEE" in the print waiting list 63 at a timing before the start or after the end of the actual printing of the collectively set print jobs "AAA", "BBB", "CCC", and "DDD". In the example of FIG. 7, since the print job "EEE" is next to the print job "DDD" in the print waiting list 63, one copy is printed after printing of 40 copies of the print job "DDD" is completed.

Some print jobs designated by the print setting information 40 may not be registered in any of the print waiting list and the print completion list. As in the above description, it is assumed that print jobs "AAA", "BBB", "CCC", and "DDD" are designated by the print setting information 40, and only the print jobs "AAA", "BBB", and "DDD" are accumulated in the storage unit 15. In such a case, the control unit 11 accepts missing of the print job "CCC" and does not determine the missing as an error. The control unit 11 may set the print jobs "AAA", "BBB", and "DDD" as the target of the collective setting of the print order and the number of print copies in accordance with the print setting information 40, and may cause the printing unit 18 to perform the actual printing of the print jobs "AAA", "BBB", and "DDD" in accordance with the collective setting.

4. Summary

As described above, according to the embodiment, the printing apparatus 10 includes the communication unit that receives print jobs, the storage unit 15 that accumulates the print jobs received by the communication unit, the printing unit 18 that prints the print jobs, and the control unit 11. The control unit 11 acquires the print setting information 40 related to the print jobs via the communication unit, performs the collective setting of the print order and/or the number of print copies of the print jobs accumulated in the storage unit 15 in accordance with the print setting information 40, and causes the printing unit 18 to perform printing in accordance with the collective setting of the print jobs accumulated in the storage unit 15.

According to the above configuration, the control unit 11 can collectively set the print order and the number of print copies for the print job received by the printing apparatus 10 from the outside and accumulated in the storage unit 15 in accordance with the print setting information 40. As a result, the user's effort and mistakes are suppressed more than before, and the print settings desired by the user can be easily and accurately realized.

In many cases, the user performs test printing on the print job accumulated in the storage unit 15 and then performs actual printing in which the print order and the number of print copies are set as desired. For this reason, for each of the print jobs for which the test printing has been completed, it is necessary to perform settings for the actual printing that are different from the settings adopted for the test printing, and in this case, it took a lot of time and effort, and mistakes in setting are likely to occur. In such a situation in which the print job that has been printed once is printed again, according to the embodiment, the control unit 11 can eliminate disadvantages of the user such as complication and mistakes in setting by performing the collective setting in accordance with the print setting information 40.

In addition, according to the embodiment, the control unit 11 causes the display unit 13 to display the print jobs of which printing in accordance with the collective setting is performed by the printing unit 18.

According to the above configuration, the control unit 11 can perform collective setting and cause the user to visually recognize the print job to be a target of printing in accordance with the collective setting.

In addition, according to the embodiment, the display unit 13 may include a reception button unit that receives an instruction to perform the collective setting, and the control unit 11 may perform the collective setting in accordance with the print setting information 40 when the reception button unit is operated.

According to the above configuration, by performing an operation such as touching or pressing the reception button unit of the display unit 13, it is possible to cause the control unit 11 to perform the collective setting in accordance with the print setting information 40 of the print job accumulated in the storage unit 15. Therefore, the user's time and effort can be greatly reduced as compared with the known technique.

In addition, according to the embodiment, the control unit 11 may perform the collective setting in accordance with the print setting information 40 when an instruction to perform the collective setting is received from the outside.

According to the above configuration, it is possible to cause the control unit 11 to perform the collective setting in accordance with the print setting information 40 of the print job accumulated in the storage unit 15 by transmitting the instruction to perform the collective setting from the outside to the printing apparatus 10. Therefore, the user's time and effort can be greatly reduced as compared with the known technique.

Further, according to the embodiment, the control unit 11 may extract a print job designated by the print setting information 40 from among the print jobs accumulated in the storage unit 15, the print jobs including a print job waiting for printing and a print job of which printing was completed, may perform the collective setting of the extracted print job in accordance with the print setting information 40, and may cause the printing unit 18 to perform printing in accordance with the collective setting of the extracted print job. According to the above configuration, under the configuration in which the print jobs accumulated in the storage unit 15 are divided into a print waiting state and a print completion state and managed, the control unit 11 can extract the print job designated by the print setting information 40 from both print jobs waiting for printing and print jobs of which printing has been completed, and can set them as targets for collective setting.

In addition, according to the embodiment, the control unit 11 may cause the printing unit 18 to print a print job not designated by the print setting information 40 among the print jobs accumulated in the storage unit 15 before or after printing in accordance with the collective setting of a print job designated by the print setting information 40.

According to the above configuration, the control unit 11 can print both the print job designated by the print setting information 40 and the print job not designated by the print setting information 40 so that print results of the print job not designated by the print setting information 40 are not mixed in print results in accordance with the collective setting of the print job designated by the print setting information 40.

The embodiment discloses disclosures in various categories, such as a method including steps performed by the device or system and a non-transitory computer-readable storage medium storing a program 12 for causing a processor to execute the method, without being limited to the device or system.

The printing method performed by the printing apparatus 10 includes an accumulation step for receiving print jobs through communication with the outside and accumulating the print jobs in the storage unit 15, an acquisition step for acquiring the print setting information 40 related to the print jobs through communication with the outside, a setting step for performing collective setting of the print order and/or the number of print copies of the print jobs accumulated in the storage unit 15 in accordance with the print setting information 40, and a printing step for performing printing in accordance with the collective setting of the print jobs accumulated in the storage unit 15.

In a non-transitory computer-readable storage medium storing the printing control program 12 for controlling the printing apparatus 10, the printing control program 12 is configured to cause the printing apparatus 10 to perform an accumulation function of receiving print jobs through communication with an outside and accumulating the print jobs in the storage unit 15, an acquisition function of acquiring the print setting information 40 related to the print jobs through communication with the outside, a setting function of performing collective setting of the print order and/or the number of copies of the print jobs accumulated in the storage unit 15 in accordance with the print setting information 40, and a printing function of performing printing in accordance with the collective setting of the print jobs accumulated in the storage unit 15.

5. Modified Examples

As an operation on the management screen 50 through the display unit 13 or the operation receiving unit 14, the user can arbitrarily select a print job registered in the print completion list by an operation different from the collective setting and can move the selected print job to the print waiting list to be a print target again.

In the above embodiment, the control unit 11 deletes the registration in the print waiting list for the print job moved from the print waiting list to the print completion list, and similarly deletes the registration in the print completion list for the print job moved from the print completion list to the print waiting list.

Apart from such specifications, specifications may be employed in which the control unit 11 retains, for a print job registered in the print completion list, past registrations thereof in the print completion list even after the print job is moved to the print waiting list and registered again in the print waiting list. Therefore, as a modified example, when the same print job is printed a plurality of times and is accumulated as a plurality of printed print jobs in the storage unit 15, the control unit 11 may set, among the plurality of printed print jobs corresponding to the same print job, the latest print job as a target of the collective setting in accordance with the print setting information 40.

Figure 8:
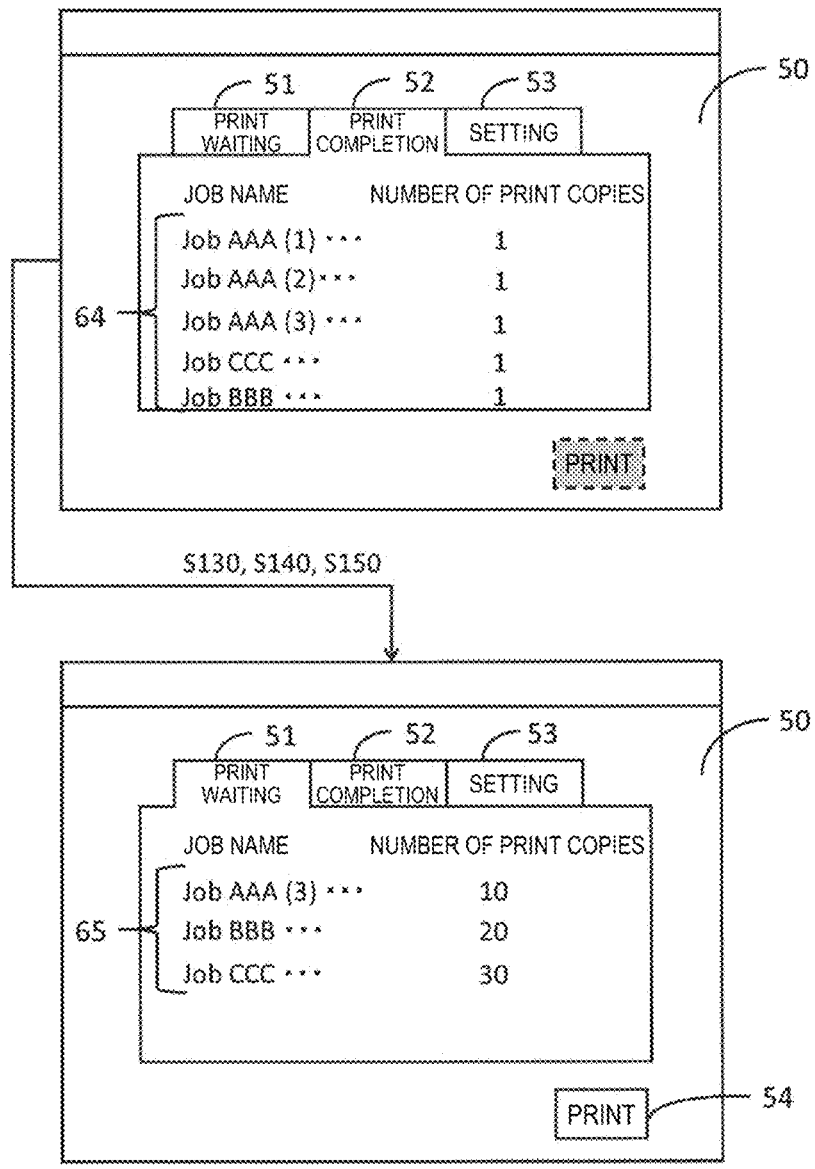
FIG. 8 is a diagram illustrating a modified example of the transition example of the display contents of the management screen.

FIG. 8 is a diagram for describing a modified example, and illustrates a state in which the display content of the management screen 50 transitions. In the management screen 50 illustrated in the upper part of FIG. 8, a print completion list 64 in which a print job "AAA(1)", a print job "AAA(2)", a print job "AAA(3)", a print job "CCC", and a print job "BBB" are registered is displayed. The print job "AAA(1)", the print job "AAA(2)", and the print job "AAA(3)" remain in the current print completion list 64 because the same print job "AAA" has been test-printed three times so far and is registered in the print completion list each time the test printing is completed. Among the print job "AAA(1)", the print job "AAA(2)", and the print job "AAA(3)", the print job "AAA(3)" is a print job registered in the print completion list after the latest test printing of the print job "AAA".

In such a situation, when Steps S130, S140, and S150 are performed, as illustrated in the lower part of FIG. 8, a print waiting list 65 in which collectively set print jobs "AAA(3)", "BBB", and "CCC" are registered is displayed on the management screen 50. Here, it is assumed that the print setting information 40 is information for designating and collectively setting the print jobs "AAA", "BBB", and "CCC". That is, the control unit 11 sets the latest print job "AAA(3)" among the plurality of printed print jobs "AAA(1)", "AAA(2)", and "AAA(3)" corresponding to the same print job "AAA" as a target of the collective setting in accordance with the print setting information 40 together with the other print jobs "CCC" and "BBB" in the print completion list 64.

According to such a modified example, the control unit 11 does not set the old print jobs except the latest print job among the plurality of printed print jobs corresponding to the same print job as the target of the collective setting in accordance with the print setting information 40. As a result, wasteful printing can be avoided in the printing of the print job in accordance with the collective setting.

The instruction to perform the collective setting by touching the Perform Collective Setting button 58 or the like may also serve as an instruction to perform printing of a print job in accordance with the collective setting. That is, the control unit 11 may automatically perform Steps S140, S150, and S160 when the instruction to perform the collective setting is received.

The medium 30 may not be a continuous medium 30 in which a plurality of frames 31 are coupled to each other as illustrated in FIG. 2, and may be a single sheet paper or the like in which one sheet corresponds to one printing unit such as a frame. In addition, steps downstream of the printing unit 18 may include handling each sheet of the medium 30 on which the actual printing is completed as one copy and performing a bending process, and handling a plurality of sheets of the medium 30 as one copy and performing a binding process.

What is claimed is:
1. A printing apparatus comprising:
  one or more processors; and
  a memory including instructions stored thereon, when executed by the one or more processors, configured to perform functions of:

a communication unit configured to receive print jobs from a user device;
a storage unit configured to accumulate the print jobs received by the communication unit in a reception order of the print jobs;
a printing unit configured to print the print jobs; and
a control unit, wherein the control unit:
acquires print setting information related to the print jobs from the user device via the communication unit, wherein the print setting information describes print settings collectively for the print jobs and identifies a print order,
performs collective setting of the print order and/or the number of print copies collectively for the print jobs accumulated in the storage unit in accordance with the print setting information, and
causes the printing unit to perform printing in accordance with the collective setting of the print jobs by following the print order regardless of the reception order of the print jobs.

2. The printing apparatus according to claim 1, wherein the control unit:
extracts a print job designated by the print setting information from among the print jobs accumulated in the storage unit, the print jobs including a print job waiting for printing and a print job of which printing was completed,
performs the collective setting of the extracted print job in accordance with the print setting information, and
causes the printing unit to perform printing in accordance with the collective setting of the extracted print job.

3. The printing apparatus according to claim 1, wherein the control unit causes a display unit to display the print jobs of which printing in accordance with the collective setting is performed by the printing unit.

4. The printing apparatus according to claim 3, wherein the display unit includes a reception button unit configured to receive an instruction to perform the collective setting and
the control unit performs the collective setting in accordance with the print setting information when the reception button unit is operated.

5. The printing apparatus according to claim 1, wherein the control unit performs the collective setting in accordance with the print setting information when an instruction to perform the collective setting is received from an outside.

6. The printing apparatus according to claim 1, wherein the control unit causes the printing unit to print a print job not designated by the print setting information among the print jobs accumulated in the storage unit before or after printing in accordance with the collective setting of a print job designated by the print setting information.

7. The printing apparatus according to claim 1, wherein when the same print job is printed a plurality of times and is accumulated as a plurality of printed print jobs in the storage unit, the control unit sets, among the plurality of printed print jobs corresponding to the same print job, a latest print job as a target of the collective setting in accordance with the print setting information.

8. The printing apparatus according to claim 1, wherein the print setting information is in a text file.

9. The printing apparatus according to claim 1, wherein the print setting information is in a comma separate value format.

10. A printing method performed by a printing apparatus, the printing method comprising:
receiving print jobs from a user device through communication with an outside and accumulating the print jobs in a storage unit in a reception order of the print jobs;
acquiring print setting information related to the print jobs from the user device through communication with the outside, wherein the print setting information describes print settings collectively for the print jobs and identifies a print order;
performing collective setting of the print order and/or the number of print copies collectively for the print jobs accumulated in the storage unit in accordance with the print setting information; and
performing printing in accordance with the collective setting of the print jobs by following the print order regardless of the reception order of the print jobs.

11. A non-transitory computer-readable storage medium storing a printing control program for controlling a printing apparatus, the printing control program being configured to cause the printing apparatus to perform:
an accumulation function of receiving print jobs from a user device through communication with an outside and accumulating the print jobs in a storage unit in a reception order of the print jobs;
an acquisition function of acquiring print setting information related to the print jobs from the user device through communication with the outside, wherein the print setting information describes print settings collectively for the print jobs and identifies a print order;
a setting function of performing collective setting of the print order and/or the number of print copies collectively for the print jobs accumulated in the storage unit in accordance with the print setting information; and
a printing function of performing printing in accordance with the collective setting of the print jobs by following the print order regardless of the reception order of the print jobs.

* * * * *